(12) United States Patent
Eguchi

(10) Patent No.: US 12,157,991 B2
(45) Date of Patent: Dec. 3, 2024

(54) DISPLAY SYSTEM FOR WORK VEHICLE, AND METHOD FOR DISPLAYING WORK VEHICLE

(71) Applicant: Komatsu Ltd., Tokyo (JP)

(72) Inventor: Taro Eguchi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 145 days.

(21) Appl. No.: 17/596,599

(22) PCT Filed: Jul. 8, 2020

(86) PCT No.: PCT/JP2020/026718
§ 371 (c)(1),
(2) Date: Dec. 14, 2021

(87) PCT Pub. No.: WO2021/010258
PCT Pub. Date: Jan. 21, 2021

(65) Prior Publication Data
US 2022/0298756 A1  Sep. 22, 2022

(30) Foreign Application Priority Data
Jul. 18, 2019  (JP) ................. 2019-133073

(51) Int. Cl.
*G06T 11/20* (2006.01)
*B60R 1/27* (2022.01)
*E02F 9/26* (2006.01)
*G06V 20/58* (2022.01)
*H04N 5/272* (2006.01)
*H04N 7/18* (2006.01)

(52) U.S. Cl.
CPC ............... *E02F 9/261* (2013.01); *B60R 1/27* (2022.01); *G06T 11/203* (2013.01); *G06V 20/58* (2022.01); *H04N 5/272* (2013.01); *H04N 7/18* (2013.01); *B60R 2300/301* (2013.01); *B60R 2300/8033* (2013.01)

(58) Field of Classification Search
None
See application file for complete search history.

(56) References Cited

U.S. PATENT DOCUMENTS

| 10,229,594 B2 * | 3/2019 | Nakamura | ........... G06V 20/588 |
| 2007/0127778 A1 * | 6/2007 | Fujimoto | ............. G06V 20/588 |
| | | | 382/104 |
| 2011/0128138 A1 | 6/2011 | Yamamoto et al. | |

(Continued)

FOREIGN PATENT DOCUMENTS

| CN | 103827943 A | 5/2014 | |
| DE | 112017007528 | * 1/2023 | ............... G08G 1/16 |

(Continued)

*Primary Examiner* — Andrew G Yang
(74) *Attorney, Agent, or Firm* — Fish & Richardson P.C.

(57) ABSTRACT

This display system is provided with: an image acquisition unit for acquiring a captured image obtained by capturing an image around a work vehicle; a detection unit for detecting an obstacle around the work vehicle; and a display control unit which, on the basis of the result of detection of the obstacle, generates a signal for displaying a marker image in a position corresponding to the obstacle, and a signal for causing the form of the marker image to change over time.

15 Claims, 7 Drawing Sheets

(56) References Cited

U.S. PATENT DOCUMENTS

| | | | |
|---|---|---|---|
| 2014/0111648 A1* | 4/2014 | Ishimoto | B60R 1/00 348/148 |
| 2014/0198214 A1* | 7/2014 | Maruoka | G08G 1/165 348/148 |
| 2016/0027218 A1* | 1/2016 | Salter | G02B 27/0093 345/633 |
| 2016/0092727 A1* | 3/2016 | Ren | G06V 20/52 382/103 |
| 2016/0134843 A1* | 5/2016 | Torrione | H04N 7/181 348/159 |
| 2016/0176338 A1* | 6/2016 | Husted | E02F 9/24 340/435 |
| 2017/0267178 A1* | 9/2017 | Shiga | H04N 23/60 |
| 2018/0157038 A1 | 6/2018 | Kabe | |
| 2018/0164114 A1* | 6/2018 | Chiu | G01C 21/3697 |
| 2018/0286094 A1* | 10/2018 | Shishido | G02B 27/0101 |
| 2019/0066310 A1* | 2/2019 | Perry | G06T 7/97 |
| 2019/0191131 A1* | 6/2019 | Uchida | H04N 9/31 |
| 2019/0360177 A1* | 11/2019 | Kiyota | H04N 7/181 |
| 2020/0097736 A1* | 3/2020 | Matsui | G06V 20/53 |
| 2020/0104622 A1* | 4/2020 | Iwamoto | G06V 20/52 |
| 2020/0148203 A1* | 5/2020 | Taniguchi | G06T 1/00 |
| 2020/0401821 A1* | 12/2020 | Roeder | G06V 20/58 |

FOREIGN PATENT DOCUMENTS

| | | | |
|---|---|---|---|
| EP | 3385457 A1 | 10/2018 | |
| EP | 3584120 A1 | 12/2019 | |
| JP | 2012-001126 A | 1/2012 | |
| JP | 2014010800 * | 1/2014 | G08G 1/16 |
| JP | 2017-074871 A | 4/2017 | |
| JP | 2017-074873 A | 4/2017 | |
| JP | A-2017-151815 | 8/2017 | |
| JP | B-6192258 | 9/2017 | |
| JP | B-6419677 | 11/2018 | |
| JP | 2018-200415 A | 12/2018 | |
| JP | 2019-049918 A | 3/2019 | |
| JP | B-6662622 | 3/2020 | |
| WO | WO 2018/042567 A1 | 3/2018 | |
| WO | WO-2018151280 A1 * | 8/2018 | B60R 1/00 |

* cited by examiner

DISPLAY SYSTEM FOR WORK VEHICLE, AND METHOD FOR DISPLAYING WORK VEHICLE

CROSS-REFERENCE TO RELATED APPLICATIONS

This application is a National Stage application under 35 U.S.C. § 371 of International Application No. PCT/JP2020/026718, filed on Jul. 8, 2020, which claims priority to Japanese Patent Application No. 2019-133073, filed on Jul. 18, 2019. The contents of the prior applications are incorporated herein in their entirety.

TECHNICAL FIELD

The present disclosure relates to a display system for a work vehicle and a method for displaying a work vehicle.

Priority is claimed on Japanese Patent Application No. 2019-133073, filed Jul. 18, 2019, the content of which is incorporated herein by reference.

BACKGROUND ART

Patent Document 1 discloses a technique related to a periphery monitoring system that detects a person in the periphery of a work vehicle. According to the technique described in Patent Document 1, the periphery monitoring system performs image processing to identify whether or not an image includes a person.

CITATION LIST

Patent Document

Patent Document 1
Japanese Unexamined Patent Application, First Publication No. 2017-151815

SUMMARY OF INVENTION

Technical Problem

As also described in Patent Document 1, it is known that a process of detecting an obstacle such as a person in an image requires a relatively large amount of calculation. For this reason, when the position of the obstacle is displayed on a screen as a marker based on a detection result, a marker update interval is longer than a frame update interval of a captured image. Therefore, when the obstacle such as a person moves during the marker update interval, the position of the obstacle and the position of the marker portrayed in the captured image deviate from each other. For this reason, there is a possibility of providing a feeling of strangeness to an operator of a work vehicle about a display of the marker.

An object of the present disclosure is to provide a display system for a work vehicle and a method for displaying a work vehicle capable of reducing a feeling of strangeness about a display of a marker.

Solution to Problem

According to one aspect of the present disclosure, there is provided a display system for a work vehicle, the system including: an image acquisition unit configured to acquire a captured image of surroundings of a work vehicle; a detection unit configured to detect an obstacle around the work vehicle; and a display control unit configured to generate a signal for displaying a marker image at a position corresponding to the obstacle and a signal for changing a form of the marker image over time, based on a detection result of the obstacle.

Advantageous Effects of Invention

According to the above aspect, the display system for a work vehicle is capable of reducing a feeling of strangeness about a display of the marker regardless of whether or not a process of detecting an obstacle takes time by changing the form of a marker over time.

DESCRIPTION OF EMBODIMENTS

First Embodiment

Hereinafter, embodiments will be described in detail with reference to the drawings.

Configuration of Work Vehicle

Figure 1:
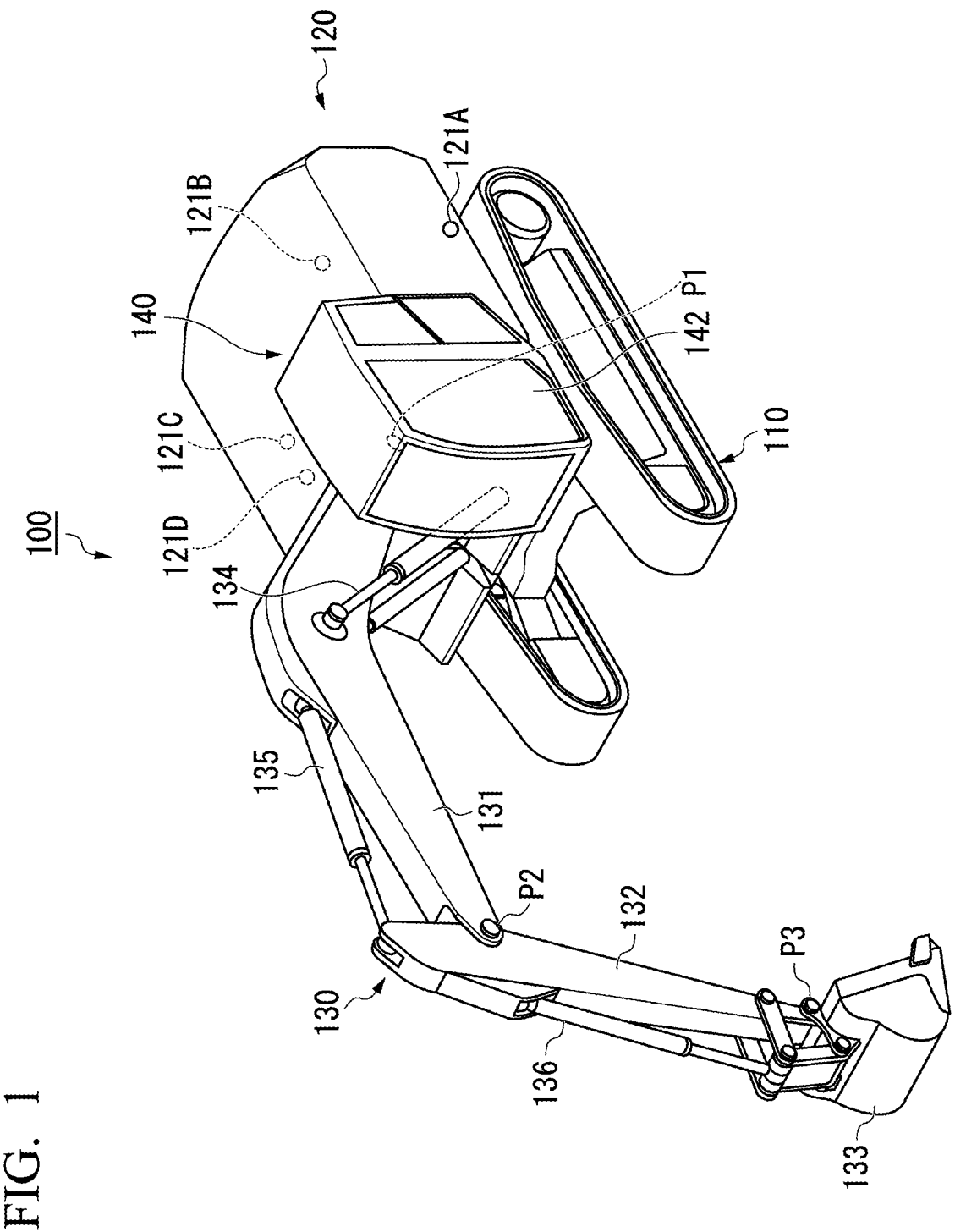
FIG. 1 is a schematic view showing a configuration of a work vehicle according to a first embodiment.

FIG. 1 is a schematic view showing a configuration of a work vehicle according to a first embodiment.

A work vehicle 100 operates at a construction site to construct a construction target such as earth. The work vehicle 100 according to the first embodiment is, for example, a hydraulic excavator. The work vehicle 100 includes an undercarriage 110, a swing body 120, work equipment 130, and a cab 140.

The undercarriage 110 supports the work vehicle 100 so as to be capable of traveling. The undercarriage 110 is, for example, a pair of right and left endless tracks.

The swing body 120 is supported by the undercarriage 110 so as to be swingable around a swing center.

The work equipment 130 is driven by hydraulic pressure. The work equipment 130 is supported by a front portion of the swing body 120 so as to be capable of driving in a vertical direction. The cab 140 is a space in which an operator gets to operate the work vehicle 100. The cab 140 is provided on a left front portion of the swing body 120.

Here, a portion of the swing body 120 to which the work equipment 130 is attached is referred to as a front portion. In addition, in the swing body 120, with reference to the front portion, a portion on an opposite side is referred to as a rear portion, a portion on a left side is referred to as a left portion, and a portion on a right side is referred to as a right portion.

Configuration of Swing Body

Figure 2:
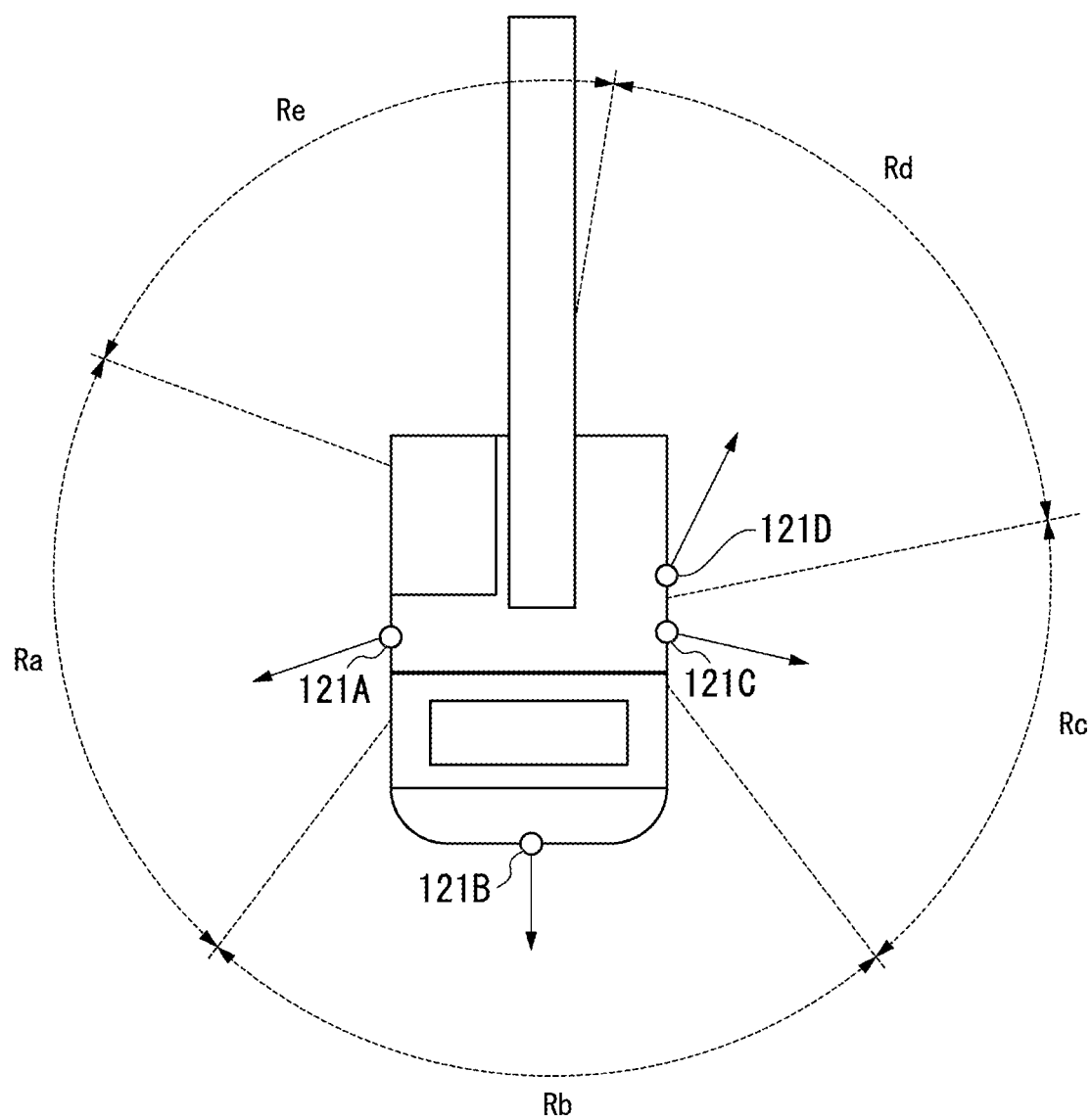
FIG. 2 is a view showing imaging ranges of a plurality of cameras provided in the work vehicle according to the first embodiment.

The swing body 120 is provided with a plurality of cameras 121 that capture images of surroundings of the work vehicle 100. FIG. 2 is a view showing imaging ranges of the plurality of cameras provided in the work vehicle according to the first embodiment. Specifically, the swing body 120 is provided with a left rear camera 121A that captures an image of a left rear range Ra around the swing body 120, a rear camera 121B that captures an image of a rear range Rb around the swing body 120, a right rear camera 121C that captures an image of a right rear range Rc around the swing body 120, and a right front camera 121D that captures an image of a right front range Rd around the swing body 120. Incidentally, the imaging ranges of the plurality of cameras 121 may partially overlap each other.

The imaging ranges of the plurality of cameras 121 cover the entire periphery of the work vehicle 100 excluding a left front range Re visible from the cab 140. Incidentally, the cameras 121 according to the first embodiment capture images of regions on left rear, rear, right rear, and right front sides of the swing body 120, but is not limited thereto in another embodiment. For example, the number of the cameras 121 and the imaging ranges according to another embodiment may differ from the example shown in FIGS. 1 and 2.

Incidentally, as shown by the left rear range Ra in FIG. 2, the left rear camera 121A captures an image of a range of a left side region and a left rear region of the swing body 120, but may capture an image of one region thereof. Similarly, as shown by the right rear range Rc in FIG. 2, the right rear camera 121C captures an image of a range of a right side region and a right rear region of the swing body 120, but may capture an image of one region thereof.

Similarly, as shown by the right front range Rd in FIG. 2, the right front camera 121D captures an image of a range of a right front region and the right side region of the swing body 120, but may capture an image of one region thereof.

Configuration of Work Equipment

The work equipment 130 includes a boom 131, an arm 132, a bucket 133, a boom cylinder 134, an arm cylinder 135, and a bucket cylinder 136.

A base end portion of the boom 131 is attached to the swing body 120 via a boom pin P1. The arm 132 connects the boom 131 and the bucket 133. A base end portion of the arm 132 is attached to a tip end portion of the boom 131 via an arm pin P2.

The bucket 133 includes blades to excavate earth, etc. and an accommodating portion to accommodate the excavated earth. A base end portion of the bucket 133 is attached to a tip end portion of the arm 132 via a bucket pin P3.

The boom cylinder 134 is a hydraulic cylinder that operates the boom 131. A base end portion of the boom cylinder 134 is attached to the swing body 120. A tip end portion of the boom cylinder 134 is attached to the boom 131.

The arm cylinder 135 is a hydraulic cylinder that drives the arm 132. A base end portion of the arm cylinder 135 is attached to the boom 131. A tip end portion of the arm cylinder 135 is attached to the arm 132.

The bucket cylinder 136 is a hydraulic cylinder that drives the bucket 133. A base end portion of the bucket cylinder 136 is attached to the arm 132. A tip end portion of the bucket cylinder 136 is attached to a link member connected to the bucket 133.

Configuration of Cab

Figure 3:
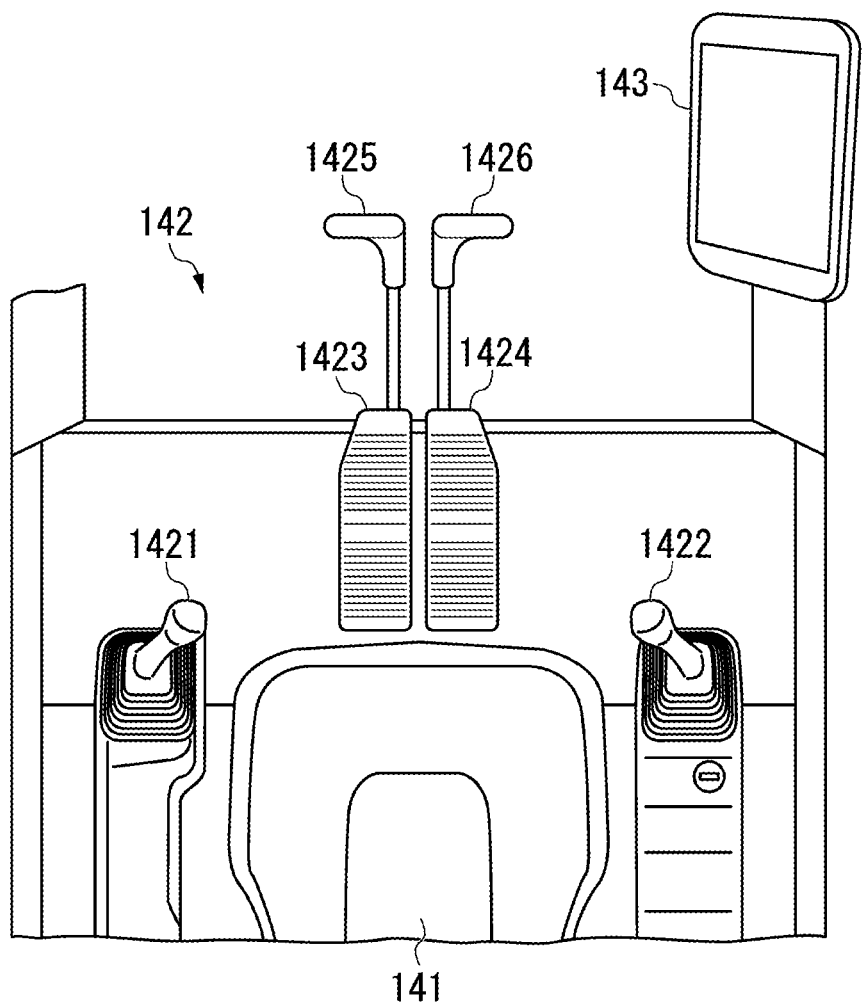
FIG. 3 is a view showing an internal configuration of a cab according to the first embodiment.

FIG. 3 is a view showing an internal configuration of the cab according to the first embodiment.

An operator's seat 141, an operation device 142, and a control device 143 are provided inside the cab 140.

The operation device 142 is an interface that drives the undercarriage 110, the swing body 120, and the work equipment 130 according to a manual operation by the operator. The operation device 142 includes a left operation lever 1421, a right operation lever 1422, a left foot pedal 1423, a right foot pedal 1424, a left traveling lever 1425, and a right traveling lever 1426.

The left operation lever 1421 is provided on a left side of the operator's seat 141. The right operation lever 1422 is provided on a right side of the operator's seat 141.

The left operation lever 1421 is an operation mechanism that causes the swing body 120 to perform a swing operation and causes the arm 132 to perform a pulling or pushing operation. Specifically, when the operator of the work vehicle 100 tilts the left operation lever 1421 forward, the arm 132 is pushed. In addition, when the operator of the work vehicle 100 tilts the left operation lever 1421 backward, the arm 132 is pulled. In addition, when the operator of the work vehicle 100 tilts the left operation lever 1421 in a right direction, the swing body 120 swings rightward. In addition, when the operator of the work vehicle 100 tilts the left operation lever 1421 in a left direction, the swing body 120 swings leftward. Incidentally, in another embodiment, when the left operation lever 1421 is tilted in a front to back direction, the swing body 120 swings rightward or leftward, and when the left operation lever 1421 is tilted in a right to left direction, the arm 132 may perform a dumping operation or an excavating operation.

The right operation lever 1422 is an operation mechanism that causes the bucket 133 to perform an excavating or dumping operation and causes the boom 131 to perform a raising or lowering operation. Specifically, when the operator of the work vehicle 100 tilts the right operation lever 1422 forward, the lowering operation of the boom 131 is executed. In addition, when the operator of the work vehicle 100 tilts the right operation lever 1422 backward, the raising operation of the boom 131 is executed. In addition, when the operator of the work vehicle 100 tilts the right operation lever 1422 in the right direction, the dumping operation of the bucket 133 is performed. In addition, when the operator of the work vehicle 100 tilts the right operation lever 1422 in the left direction, the excavating operation of the bucket 133 is performed.

The left foot pedal 1423 is disposed on a left side of a floor surface in front of the operator's seat 141. The right foot pedal 1424 is disposed on the right side of the floor surface in front of the operator's seat 141. The left traveling lever 1425 is pivotally supported by the left foot pedal 1423 and is configured such that the inclination of the left traveling lever 1425 and the pressing down of the left foot pedal 1423 are linked. The right traveling lever 1426 is pivotally supported by the right foot pedal 1424 and is configured such that the inclination of the right traveling lever 1426 and the pressing down of the right foot pedal 1424 are linked.

The left foot pedal 1423 and the left traveling lever 1425 correspond to rotational drive of a left crawler belt of the undercarriage 110. Specifically, when the operator of the work vehicle 100 tilts the left foot pedal 1423 or the left traveling lever 1425 forward, the left crawler belt rotates in a forward movement direction. In addition, when the operator of the work vehicle 100 tilts the left foot pedal 1423 or the left traveling lever 1425 backward, the left crawler belt rotates in a backward movement direction.

The right foot pedal 1424 and the right traveling lever 1426 correspond to rotational drive of a right crawler belt of the undercarriage 110. Specifically, when the operator of the work vehicle 100 tilts the right foot pedal 1424 or the right traveling lever 1426 forward, the right crawler belt rotates in the forward movement direction. In addition, when the operator of the work vehicle 100 tilts the right foot pedal 1424 or the right traveling lever 1426 backward, the right crawler belt rotates in the backward movement direction.

The control device 143 is an input and output device, and is capable of displaying, for example, as an overhead image, a situation around the work vehicle 100 acquired by the plurality of cameras 121. Input means of the control device 143 according to the first embodiment is a hardware key. Incidentally, in another embodiment, a touch panel, a mouse, a keyboard, etc. may be used as the input means.

Configuration of Control Device

Figure 4:
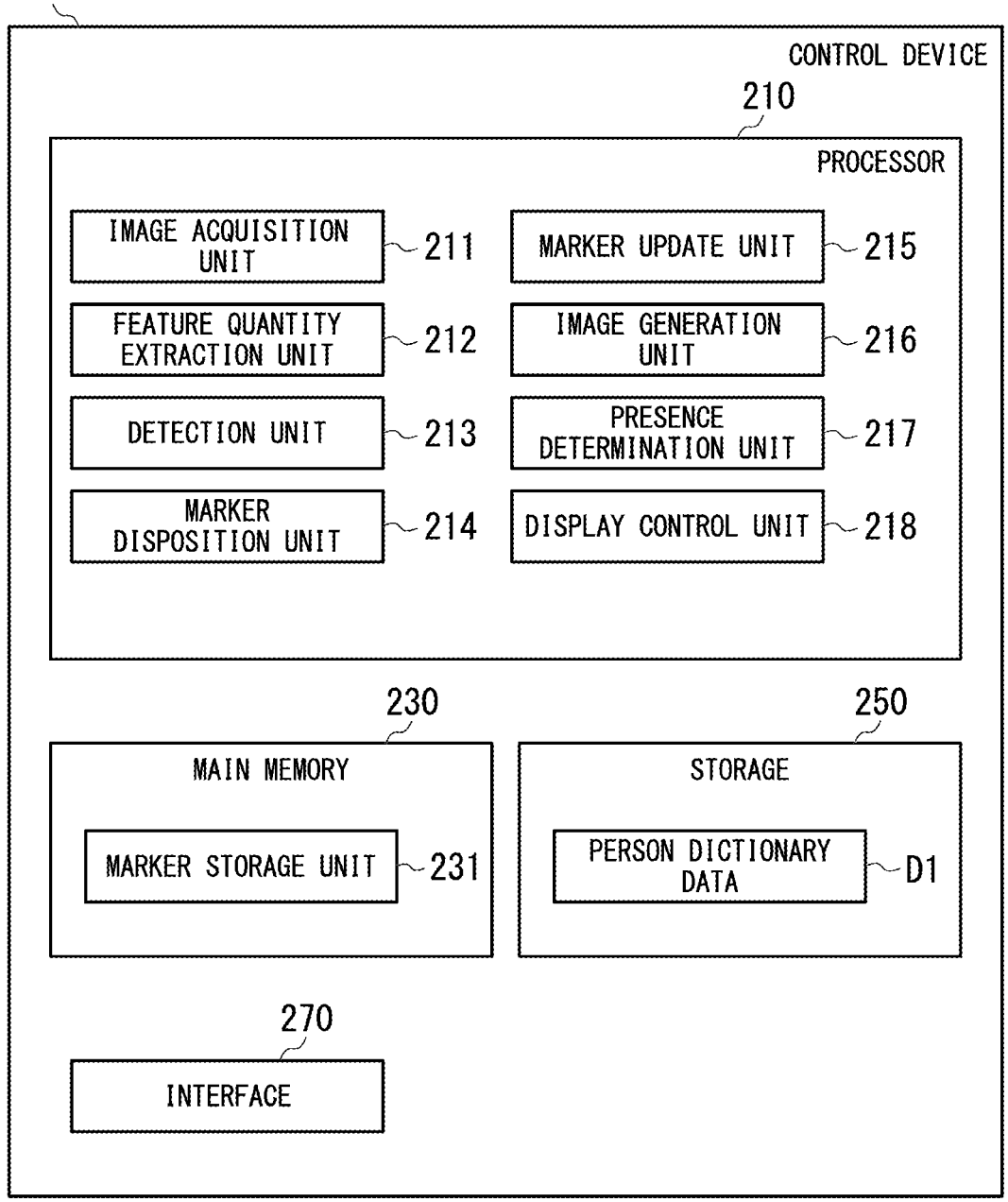
FIG. 4 is a schematic block diagram showing a configuration of a computer according to at least one embodiment.

FIG. 4 is a schematic block diagram showing a configuration of a computer according to at least one embodiment.

The control device 143 is a computer including a processor 210, a main memory 230, a storage 250, and an interface 270.

The storage 250 is a non-transitory storage medium. Exemplary examples of the storage 250 include a hard disk drive (HDD), a solid state drive (SSD), a magnetic disk, a magneto-optical disk, a compact disc read only memory (CD-ROM), a digital versatile disc read only memory (DVD-ROM), a semiconductor memory, etc. The storage 250 may be an internal medium directly connected to a bus of the control device 143 or may be an external medium to be connected to the control device 143 via the interface 270 or a communication line. The storage 250 stores a program for realizing the monitoring of the surroundings of the work vehicle 100.

The program may realize some of functions to be exhibited by the control device 143. For example, the program may exhibit functions in combination with another program already stored in the storage 250 or in combination with another program installed in another device. Incidentally, in another embodiment, the control device 143 may include a custom large scale integrated circuit (LSI) such as a programmable logic device (PLD) in addition to the above configuration or instead of the above configuration. Exemplary examples of the PLD include a programmable array logic (PAL), a generic array logic (GAL), a complex programmable logic device (CPLD), and a field programmable gate array (FPGA). In this case, some or all of the functions to be realized by the processor may be realized by the integrated circuit.

In addition, the storage 250 stores person dictionary data D1 to detect a person. The person dictionary data D1 is, for example, dictionary data of a feature quantity to be extracted from each of a plurality of known images in which persons are portrayed. As an example of the feature quantity, histograms of oriented gradients (HOG) or Co-occurrence HOG (CoHOG) can be used.

The processor 210 executes the program to function as an image acquisition unit 211, a feature quantity extraction unit 212, a detection unit 213, a marker disposition unit 214, a marker update unit 215, an image generation unit 216, a presence determination unit 217, and a display control unit 218. In addition, a storage region of a marker storage unit 231 is secured in the main memory 230 by executing the program.

The image acquisition unit 211 acquires images from the plurality of cameras 121. The image acquired from each of the cameras 121 is a frame image to be updated at a predetermined frame rate.

The feature quantity extraction unit 212 extracts a feature quantity from the frame images acquired by the image acquisition unit 211. Exemplary examples of the feature quantity to be extracted by the feature quantity extraction unit 212 include a HOG feature quantity, a CoHOG feature quantity, etc.

The detection unit 213 detects a person in the frame images based on the feature quantity extracted by the feature quantity extraction unit 212 and the person dictionary data D1 stored in the storage 250. Exemplary examples of a method for detecting a person include pattern matching, an object detection process based on machine learning, etc. A person is one example of an obstacle. Incidentally, in the first embodiment, the detection unit 213 detects a person using the feature quantity of the image, but is not limited thereto. For example, in another embodiment, the detection unit 213 may detect a person based on a measured value of an infrared sensor.

The image generation unit 216 transforms and combines a plurality of the frame images acquired by the image acquisition unit 211, to generate an overhead image of a site viewed from above in which the work vehicle 100 is centered. Namely, the image generation unit 216 transforms each of the plurality of frame images into an overhead coordinate system, and combines the transformed frame images to generate an overhead image. Incidentally, the image generation unit 216 may cut out a part of each of the transformed frame images, and combine the cutout frame images to generate an overhead image. An image in which the work vehicle 100 is viewed in a planar view from above is affixed in advance to the center of the overhead image generated by the image generation unit 216.

The marker disposition unit 214 disposes a marker indicating the position of a person at a position corresponding to the detection position of the person, such that the marker is superimposed on the overhead image generated by the image generation unit 216. Incidentally, the marker disposition unit 214 according to another embodiment may dispose a marker within a predetermined range from the detection position. Exemplary examples of the shape of the marker include a circular shape, an elliptical shape, a regular polygon shape, a polygon shape, etc. The marker disposition unit 214 records the position of the disposed marker and the initial size of the marker in the marker storage unit 231. The marker storage unit 231 stores the position and the size of the marker disposed in the overhead image in association with each other.

The marker disposition unit 214 sets a different color for the marker according to a positional relationship between the detection position and a warning range set around the work vehicle 100. For example, the marker disposition unit 214 sets the color of the marker to red when the detection position is within the warning range, and sets the color of the marker to yellow color when the detection position is outside the warning range. The warning range may be set as, for example, a circle having the swing center of the work vehicle 100 as a center.

Incidentally, the color of the marker and the relationship between the position and the color of the marker are not limited thereto. For example, the marker disposition unit 214 according to another embodiment may set a color other than red and yellow colors for the marker. In addition, the marker disposition unit 214 according to another embodiment may set the color of the marker to red when the detection position is within the warning range, set the color of the marker to yellow color when the detection position is outside the warning range but within a caution range, and set the color of the marker to gray color when the detection position is outside the caution range. In addition, when the detection position is within the warning range or the caution range, the color of the marker may be set to red. In addition, the color of the marker may be set to red regardless of the detection position. The caution range may be set as, for example, a circle having the swing center of the work vehicle 100 as a center and a range outside the warning range.

In addition, the marker disposition unit 214 may highlight a region including the detection position of a person, together with the disposition of the marker in the overhead image. The region is determined by the imaging ranges of the plurality of cameras 121. Exemplary examples of the highlighting include displaying a frame of the region as a thick red frame. Incidentally, the highlighting is not limited to the above example, and may be done with a color other than red color. In addition, the highlighting may be done by blinking the frame of the region.

In addition, only when the detection position is within the warning range or the caution range, the marker disposition unit 214 may highlight a region including the position. In this case, a marker is disposed on the detected person and a region corresponding to the detection position is highlighted, so that the operator can easily figure out the person to which caution has to be given, and a direction. Namely, the control device 143 is capable of encouraging the operator to exercise caution.

The marker update unit 215 enlarges the size of the marker disposed in the overhead image over time. The marker update unit 215 updates the size of the marker stored in the marker storage unit 231. The enlargement speed of the marker is determined based on, for example, a speed assumed as the moving speed of a person in the overhead image. For example, when the enlargement speed of the marker is set to a maximum speed assumed as the moving speed of a person in the overhead image, it can be ensured that the moving person is located always within the range of the marker in the overhead image. Incidentally, the enlargement speed of the marker is not limited to the maximum speed, and may be set to another speed such as an average speed or the individual speed of a person.

The presence determination unit 217 determines whether or not a person is present inside the caution range or the warning range set around the work vehicle 100, based on the detection position in the overhead coordinate system.

The display control unit 218 attaches an icon to the overhead image in which the marker is disposed, to generate a monitoring image, the icon corresponding to a determination result of the presence determination unit 217. The display control unit 218 outputs the generated monitoring image to a touch panel. The form of the icon is set differently between, for example, when a person is not present within the caution range, when a person is present within the caution range but outside the warning range, and when a person is present within the warning range. Exemplary examples of the form of the icon include color, transparency, size, etc.

Operation of Control Device

Figure 5:
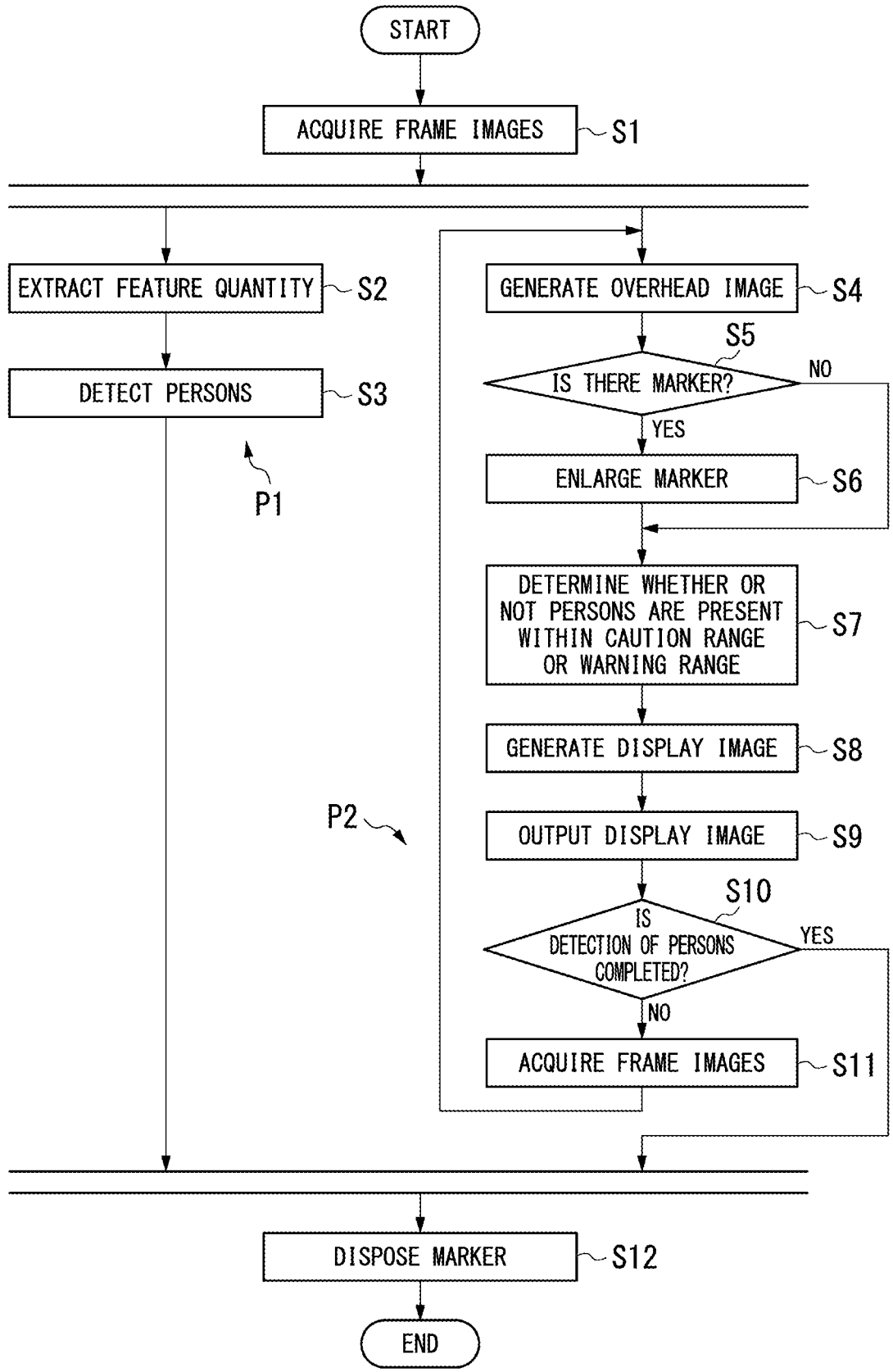
FIG. 5 is a flowchart showing operation of a control device according to the first embodiment.

FIG. 5 is a flowchart showing operation of the control device according to the first embodiment.

When the control device 143 starts a process of monitoring the surroundings, the image acquisition unit 211 acquires frame images from the plurality of cameras 121 (step S1). Next, the control device 143 executes a person detection process P1 and a display control process P2 in parallel based on the acquired frame images. Incidentally, in another embodiment, the person detection process P1 and the display control process P2 may be executed in series.

The person detection process P1 is a process from step S2 to step S3 below.

The feature quantity extraction unit 212 extracts a feature quantity from the frame images acquired in step S1 (step S2). Next, the detection unit 213 reads the person dictionary data D1 from the storage 250, and compares the extracted feature quantity with the person dictionary data D1 to specify detection positions at which persons are present in the frame images (step S3).

The display control process P2 is a process from step S4 to step S11 below.

The image generation unit 216 generates an overhead image based on the frame images acquired in step S1 (step S4). The marker update unit 215 refers to the marker storage unit 231 to determine whether or not there is a marker disposed in the overhead image (step S5). When there is the disposed marker (step S5: YES), the marker update unit 215 updates the size of each marker stored in the marker storage unit 231 to a size enlarged by a predetermined amount (step S6). Incidentally, in another embodiment, the marker update unit 215 may enlarge the disposed marker for a certain period of time without performing a determination in step S5.

When there is no disposed marker (step S5: NO), or when the size of the marker is updated, the presence determination unit 217 determines whether or not persons are present inside the caution range or the warning range, based on the position of the marker stored in the marker storage unit 231 (step S7).

The display control unit 218 draws a marker for the position and the size stored in the marker storage unit 231, on the overhead image generated in step S4, and attaches an icon at a position corresponding to the left front range Re in the overhead image to generate a monitoring image, the icon corresponding to a determination result in step S7 (step S8). The display control unit 218 can prevent the icon from covering a part of the frame image by attaching the icon to the left front range Re. Incidentally, the display control unit 218 according to another embodiment may attach an icon to another place. The display control unit 218 outputs the generated monitoring image to the touch panel (step S9).

Next, the display control unit 218 determines whether or not the person detection process P1 is completed (step S10). When the person detection process P1 is not completed (step S10: NO), the image acquisition unit 211 acquires next frame images from the plurality of cameras 121 (step S11), and the process returns to step S4.

When the person detection process P1 and the display control process P2 are completed, the marker disposition unit 214 disposes a marker of an initial size at a position corresponding to the detection position related to the result of the detection process in step S3. Namely, the marker disposition unit 214 records the position corresponding to the detection position and information of the marker of the initial size in the marker storage unit 231 (step S12), and the control device 143 ends a periphery monitoring process.

Incidentally, the marker disappears when a certain period of time has elapsed from the disposition of the marker. Namely, the marker disposition unit 214 deletes information of the corresponding marker from the marker storage unit 231 when a certain period of time has elapsed from the disposition of the marker. Incidentally, the marker disposition unit 214 according to another embodiment may delete a marker when the marker reaches a predetermined size or larger. In addition, in this case, the marker disposition unit 214 may determine the color of the marker based on a relationship between the detection position and the warning range.

Incidentally, the person detection process P1 may be executed on the plurality of frame images in parallel that are captured by the plurality of cameras 121, or may be executed on the frame images in order. In addition, when a marker related to a person extracted from other frame images is already at the detection position, the marker disposition unit 214 may not dispose a marker at the detection position. Accordingly, the overlapping disposition of markers which makes it difficult to see the markers can be prevented. Alternatively, when a marker related to a person extracted from other frame images is already within a predetermined distance from the detection position, the marker disposition unit 214 may delete the existing marker, and dispose a marker at the detection position. Accordingly, the marker can be disposed at the latest detection position.

Incidentally, the flowchart shown in FIG. 5 is one example, and in another embodiment, all the steps may not be necessarily executed. For example, in another embodiment, any one of step S2, steps S5, and steps S7 to S11 may not be executed.

Example of Display Image

Figure 6:
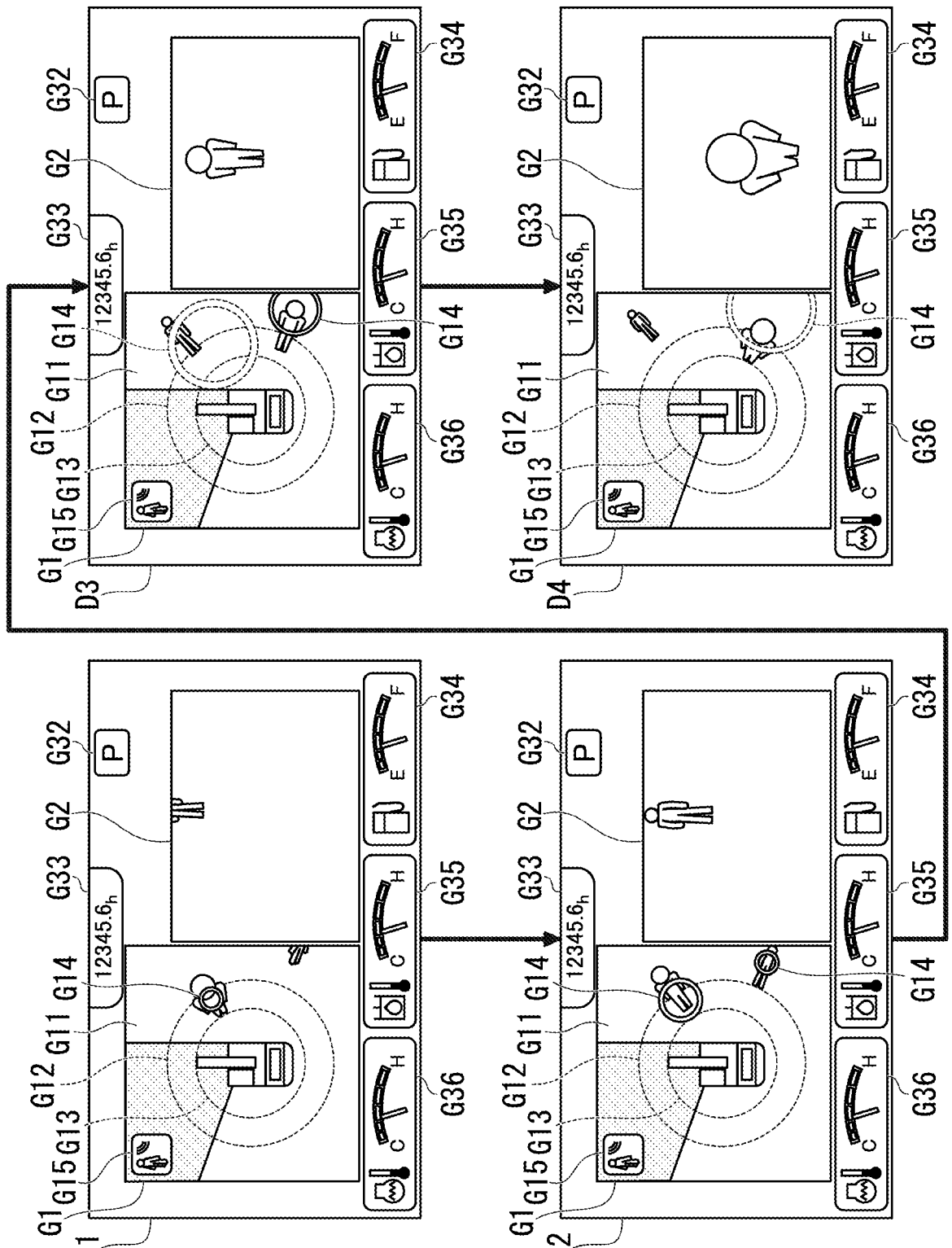
FIG. 6 is an example of a display image to be displayed when a person is detected.

FIG. 6 is an example of a transition of display images according to the first embodiment. Specifically, FIG. 6 shows a transition of display images to be displayed from time T1 when a person is detected to time T4 after a predetermined period of time.

According to FIG. 6, a monitoring image G1 and a single camera image G2 generated by the display control unit 218 are to be displayed in each of display images D1 to D4 at each time. In addition, each of the display images D1 to D4 include a work mode indicator G32, an service meter reading (SMR) indicator G33, a fuel level indicator G34, a hydraulic oil temperature indicator G35, and an engine coolant temperature indicator G36. The monitoring image G1 includes an overhead image G11, a region frame G12 indicating the caution range, a region frame G13 indicating the warning range, a plurality of markers G14, and an icon G15. The single camera image G2 is a frame image captured by one of the plurality of cameras 121.

When the work vehicle is keyed on, a frame image captured by the rear camera 121B is to be displayed as the single camera image G2. The single camera image G2 can be switched to a frame image captured by another camera 121 by the input means of the control device 143. Incidentally, a frame image captured by one of the cameras 121 other than the rear camera 121B may be used as the single camera image G2 to be displayed at key-on. In addition, when a person is detected, the single camera image G2 may be automatically switched to a frame image of the camera 121 that captures an image of the person. Incidentally, FIG. 6 is an example of the single camera image G2 that displays a frame image captured by the right rear camera 121C.

Referring to FIG. 6, it can be seen that as time elapses from time T1, the overhead image G11 and the single camera image G2 are updated and the position of the person is moved. Namely, the positions of the person are different in the display image D1 at time T1, the display image D2 at time T2, the display image D3 at time T3, and the display image D4 at time T4. The reason is that the display control process P2 is repeatedly executed during execution of the person detection process P1 as in the flowchart shown in FIG. 5.

On the other hand, referring to FIG. 6, it can be seen that as time elapses from time T1, the marker G14 enlarges while the disposition position is maintained. Namely, the size of the marker G14 increases in order of the display image D1, the display image D2, and the display image D3. For this reason, even when the center position of the marker G14 deviates slightly from the position of the person with the movement of the person, the amount of deviation between the person and the marker G14 is reduced because of the enlargement of the marker G14. Therefore, it is possible to reduce a feeling of strangeness of the operator. Incidentally, at time T4, when a certain period of time has elapsed since the marker G14 is disposed at the position of a person present on the right front side of the work vehicle 100, the marker G14 is to be deleted from the display image D4. Incidentally, thereafter, when a person on the right front side of the work vehicle 100 is detected, the marker G14 is to be disposed again at the position of the person present on the right front side.

Effects

As described above, the control device 143 according to the first embodiment detects a person portrayed in a captured image of the surroundings of the work vehicle 100, and generates a signal for displaying a marker at a position corresponding to the obstacle, and a signal for changing the form of the marker over time, based on a detection result.

Accordingly, the control device 143 enlarges the marker over time and causes the marker to follow the person even when the person moves during the process of detecting the person. Therefore, it is possible to reduce a feeling of strangeness related to a display of the marker.

Incidentally, the control device 143 according to the first embodiment enlarges a marker over time, but is not limited thereto in another embodiment. For example, the control device 143 according to another embodiment may change the color or transparency of a marker over time, may rotate a marker or reduce a size of a marker or may set the thickness or line type of a contour line differently over time. Even when a marker is not enlarged, it is possible to reduce a feeling of strangeness about the switching of a display of the marker. In addition, the form of a marker is changed over time to enable the operator to notice the presence of the marker easily.

In addition, the control device 143 according to the first embodiment is capable of making a notice about the presence of the person on the overhead image by attaching a marker to an overhead image in which a person is actually portrayed. On the other hand, the control device 143 according to another embodiment is not limited thereto, and may display that a marker is attached on a plane coordinates that does not include an overhead image.

In addition, the control device 143 according to the first embodiment displays an icon on an overhead image in a superimposed manner, the icon indicating a result of a determination as to whether or not a person is present in the caution range or the warning range around the work vehicle 100. Accordingly, the control device 143 enables an operator to notice the presence of the person easily. In addition, according to the first embodiment, the icon is disposed in a region included in the left front range Re in the overhead image, the left front range Re being a region visible from the operator's seat 141 of the work vehicle 100. Accordingly, the left front range Re is visible from the operator's seat 141, so that the icon is disposed at a position at which the necessity for monitoring by the control device 143 is low. As a result, the icon can be prevented from covering a person present at a position at which the necessity for monitoring by the control device 143 is high.

Other Embodiments

One embodiment has been described above in detail with reference to the drawings; however, the specific configuration is not limited to the above-described configuration, and various design changes, etc. can be made. In another embodiment, the order of the above-described processes may be appropriately changed. In addition, some of the processes may be executed in parallel.

In the above-described embodiment, the work vehicle 100 has been described as being a hydraulic excavator; however, in another embodiment, the invention is applicable to various work vehicles such as dump trucks and wheel loaders. For example, the invention is applicable to a display system for dump trucks, wheel loaders, or other work vehicles.

In addition, in the above-described embodiment, one control device 143 has been described as being installed in the work vehicle; however, in another embodiment, the invention may be realized by a display system in which a part of the configuration of the control device 143 is disposed in other control devices, and which is formed of two or more control devices. Incidentally, one control device 143 shown in the above-described embodiment is also one example of a display system.

In addition, the control device 143 according to the above-described embodiment has been described as being installed in the work vehicle; however, in another embodiment, a part or the entirety of the configuration of the control device 143 may be installed outside the work vehicle.

In addition, the control device 143 according to the above-described embodiment detects a person, but may detect an obstacle other than a person.

In addition, the control device 143 according to the above-described embodiment does not include a left front camera that captures an image of the left front range Re, but may include a left front camera that captures an image of the left front range Re in another embodiment. In this case, the control device 143 is capable of generating an overhead image in which the entire periphery around the work vehicle 100 is portrayed. On the other hand, also in this case, the control device 143 may not detect a person from a frame image of the left front camera in the person detection process P1. This technique aims to preventing an increase in overall calculation load by not performing the person detection process P1 in a range in which the necessity for monitoring by the control device 143 is low, since the amount of calculation of the person detection process P1 is large.

The control device 143 according to the above-described embodiment includes a display, and causes a display image to be displayed on the display, but is not limited thereto in another embodiment. For example, the control device 143 according to another embodiment may not include a display, and may transmit a signal for displaying a display image on a display separate from the control device 143. The signal is a signal for displaying a display image in which a marker is disposed at a position corresponding to an obstacle, and for changing the form of a marker over time. Incidentally, the invention may be realized by a display system formed of a display separate from the control device 143, and two or more control devices each including part of the configuration of the control device 143 described above.

In addition, in the above-described embodiment, the display has been described as being installed in the work vehicle 100; however, in another embodiment, the display may be installed outside the work vehicle 100. For example, a display may be provided at a point away from a work site, and the control device 143 may transmit a signal for displaying a display image on the display via a network such as the Internet.

In addition, in the above-described embodiment, the warning range and the caution range have been described as being set; however, in another embodiment, one range of the warning range and the caution range may be set. In addition, three or more ranges may be set.

In addition, in the above-described embodiment, the marker G14 is attached to the overhead image G11, but is not limited thereto. For example, in another embodiment, the markers G14 may be attached to both of the overhead image Gil and the single camera image G2, or the marker G14 may be attached only to the single camera image G2. In addition, in another embodiment, a display image may include only one of the overhead image G11 and the single camera image G2. In this case, the marker G14 is attached to the overhead image G11 or the single camera image G2 included in the display image. In addition, in another embodiment, the single camera images G2 captured by the plurality of cameras 121 may be displayed side by side. In this case, the marker G14 may be attached to one single camera image G2, or the markers G14 may be attached to two or more single camera images.

In addition, in the above-described embodiment, each of the warning range and the caution range has been described as being set as a circle having the swing center of the work vehicle as a center, but in another embodiment, may be a range other than a circle which has the swing center of the work vehicle 100 as a center. For example, each of the warning range and the caution range may be a range obtained by partially extending a circle in directions of a front portion, a rear portion, a left portion, and a right portion of the circle by a predetermined distance, the circle having the swing center of the work vehicle 100 as a center. In addition, each of the warning range and the caution range may be set as a circle having a portion other than the swing center of the work vehicle 100 as a center. In addition, each of the warning range and the caution range may be a range obtained from an operation range of the work equipment 130. In addition, each of the warning range and the caution range may be a range formed of an ellipse, a polygon, or straight lines and curved lines.

Figure 7:
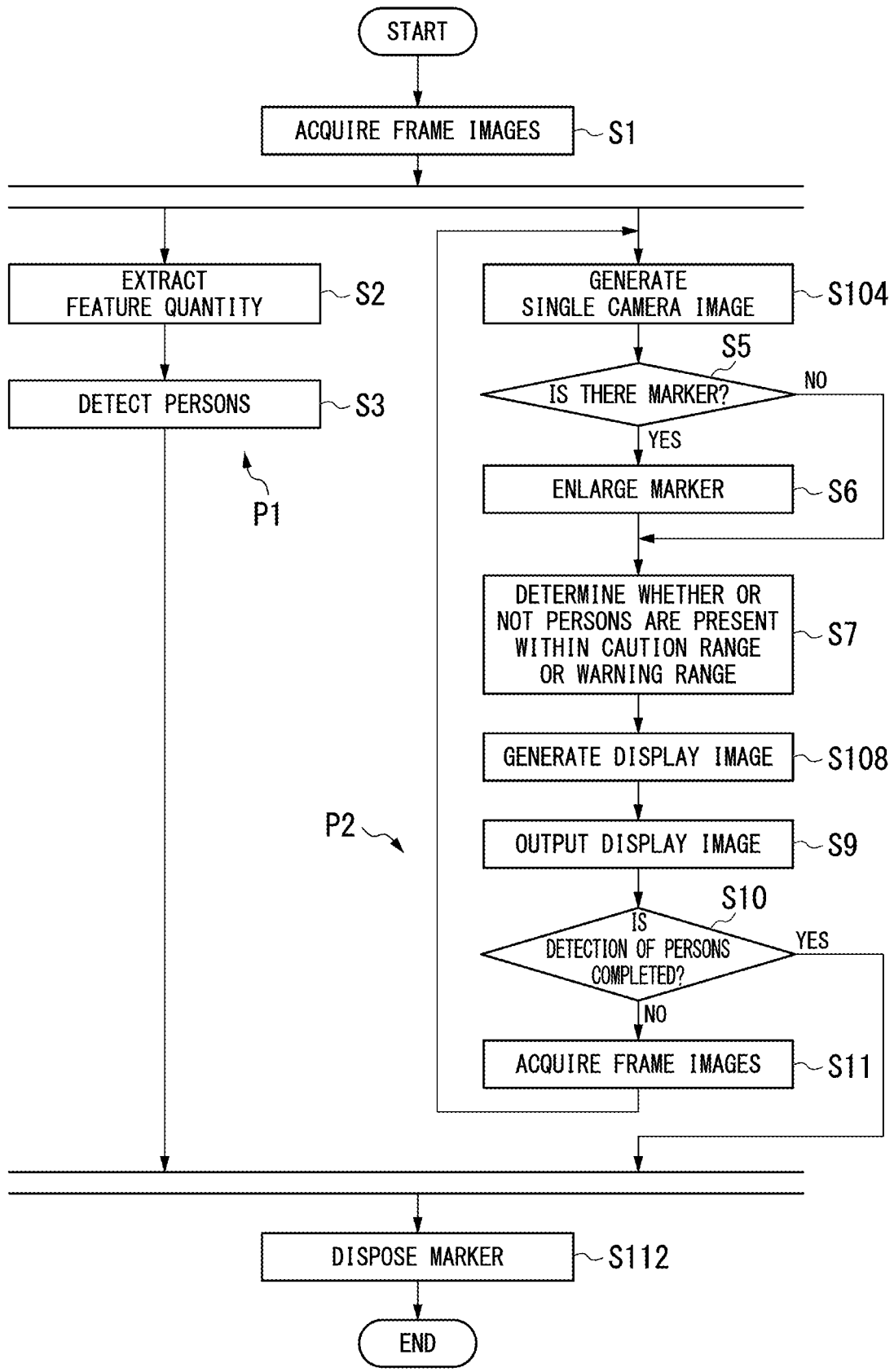
FIG. 7 is a flowchart showing operation of the control device according to another embodiment.

Here, an example will be described in which the control device 143 generates a display image including the single camera image G2 to which the marker G14 is attached. FIG. 7 is a flowchart showing operation of the control device according to another embodiment. In another embodiment, the control device 143 executes step S104, step S108, and step S112 instead of step S4, step S8, and step S13 in the first embodiment. In step S104, the image generation unit 216 of the control device 143 generates a single camera image based on a frame image acquired in step S1.

In step S108, the display control unit 218 of the control device 143 draws a marker for the position and the size stored in the marker storage unit 231, on the single camera image generated in step S104, and attaches an icon corresponding to a determination result in step S7 to the single camera image to generate a display image. The icon is disposed at a position at which the necessity for monitoring is low, such as a region in which a part of the work vehicle 100 is shown, in the single camera image, so that the icon can be prevented from covering a person present at a position at which the necessity for monitoring by the control device 143 is high.

In step S112, the marker disposition unit 214 of the control device 143 disposes a marker of an initial size at a detection position related to a result of the detection process in step S3.

Namely, the marker disposition unit 214 records the detection position and information of the marker of the initial size in the marker storage unit 231.

INDUSTRIAL APPLICABILITY

According to the above disclosure, the display system for a work vehicle is capable of reducing a feeling of strangeness about a display of the marker regardless of whether or not the process of detecting an obstacle takes time by changing the form of a marker over time.

The invention claimed is:

1. A display system for a work vehicle, the display system comprising:
a control device,
wherein the control device is configured to:
acquire a captured image of surroundings of the work vehicle;
detect a person around the work vehicle;
generate a signal for displaying a marker image at a position corresponding to the person based on a detection result of the person, the marker image having a circular shape;
determine an enlargement speed of the marker image based on a moving speed of the person in an overhead image of the surroundings of the work vehicle; and
generate a signal for enlarging a size of the marker image over time based on the enlargement speed to thereby reduce a deviation between the person and a center position of the marker image to cause the marker image to follow the detected person.

2. The display system according to claim 1, wherein the control device is further configured to:
generate the overhead image of the surroundings of the work vehicle based on the captured image; and
generate (i) the signal for displaying the marker image at the position corresponding to the person on the overhead image and (ii) the signal for enlarging the size of the marker image over time.

3. The display system according to claim 1, wherein the control device is further configured to:
generate a single camera image which is an image of the surroundings of the work vehicle, based on the captured image; and
generate a signal for disposing the marker image at the position corresponding to the person on the single camera image, and for enlarging the size of the marker image over time.

4. The display system according to claim 1, wherein the control device is further configured to:
determine whether or not the person is present within a predetermined range around the work vehicle; and
generate a signal for displaying a display image including an icon indicating a determination result as to whether or not the person is present within the predetermined range.

5. The display system according to claim 4, wherein the icon is to be disposed in a region on the display image, the region being included in a range visible from an operator's seat of the work vehicle.

6. The display system according to claim 1, wherein the control device is further configured to, based on the detected person moving relative to the work vehicle, generate the signal for enlarging the size of the marker image over time to thereby locate the person within a range from the marker image.

7. The display system according to claim 1, wherein the control device is further configured to generate the signal for enlarging the size of the marker image while maintaining a disposition position of the marker image.

8. The display system according to claim 1, wherein the control device is further configured to, based on a period of time having elapsed from a disposition of the marker image, delete the marker image.

9. The display system according to claim 1, wherein at least a portion of the marker image overlaps with the detected person.

10. The display system according to claim 1, wherein the control device is configured to generate the signal for enlarging the size of the marker image over time regardless of a distance between the work vehicle and the person.

11. The display system according to claim 1, wherein the control device is further configured to generate a signal for deleting the marker image based on an elapse of time since the marker image is disposed at the position corresponding to the detected person.

12. The display system according to claim 11, wherein the control device is further configured to, based on another person being detected around the work vehicle after the marker image is deleted, generate a signal for displaying another marker image at a position corresponding to the detected another person.

13. The display system according to claim 1, wherein the control device is further configured to, based on another person being detected around the work vehicle, generate a signal for displaying another marker image at a position corresponding to the detected another person.

14. The display system according to claim 1, wherein the marker image crosses at least a portion of the detected person in the overhead image.

15. A method for displaying a work vehicle, the method comprising:
acquiring a captured image of surroundings of the work vehicle;
detecting a person around the work vehicle; and
generating a signal for displaying a marker image at a position corresponding to the person based on a detection result of the person, the marker image having a circular shape;
determining an enlargement speed of the marker image based on a moving speed of the person in an overhead image of the surroundings of the work vehicle; and
generating a signal for enlarging a size of the marker image over time based on the enlargement speed to thereby reduce a deviation between the person and a center position of the marker image to cause the marker image to follow the detected person.

* * * * *